(12) United States Patent
Gold et al.

(10) Patent No.: US 6,392,607 B1
(45) Date of Patent: May 21, 2002

(54) ANTENNA SYSTEM ESPECIALLY FOR AN ANTI-THEFT SYSTEM OF A MOTOR VEHICLE

(75) Inventors: Peter Gold, Sinzing; Michael Stippler, Schwandorf, both of (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/530,433

(22) PCT Filed: Oct. 30, 1998

(86) PCT No.: PCT/DE98/03185

§ 371 Date: Sep. 1, 2000

§ 102(e) Date: Sep. 1, 2000

(87) PCT Pub. No.: WO99/23716

PCT Pub. Date: May 14, 1999

(30) Foreign Application Priority Data

Oct. 31, 1997 (DE) .......................................... 197 48 327

(51) Int. Cl.$^7$ .................................................. H01Q 1/32
(52) U.S. Cl. ......................................... 343/713; 343/742
(58) Field of Search ................................. 343/713, 742, 343/741, 866, 867; 307/10.1, 10.2, 10.3; 340/505, 572, 825.34, 825.54

(56) References Cited

U.S. PATENT DOCUMENTS

| | | | | |
|---|---|---|---|---|
| 5,132,551 A | * | 7/1992 | Carlo et al. | 307/10.3 |
| 5,449,957 A | * | 9/1995 | Carlo | 307/10.3 |
| 5,796,180 A | * | 8/1998 | Glehr | 307/10.5 |

* cited by examiner

*Primary Examiner*—Tan Ho

(57) ABSTRACT

An antenna system, especially for an anti-theft system of a motor vehicle. A primary magnetic field is produced by a primary coil (2). In the vicinity of the primary coil (2), a coupling coil (11) is disposed which is connected by a flexible conductor (12) with a secondary coil (13). By the magnetic connection of the primary field a secondary field can be produced through the secondary coil (13), which due to the distributed installation of the secondary coils (13) can act specifically in areas in which the primary field is not acting.

5 Claims, 2 Drawing Sheets

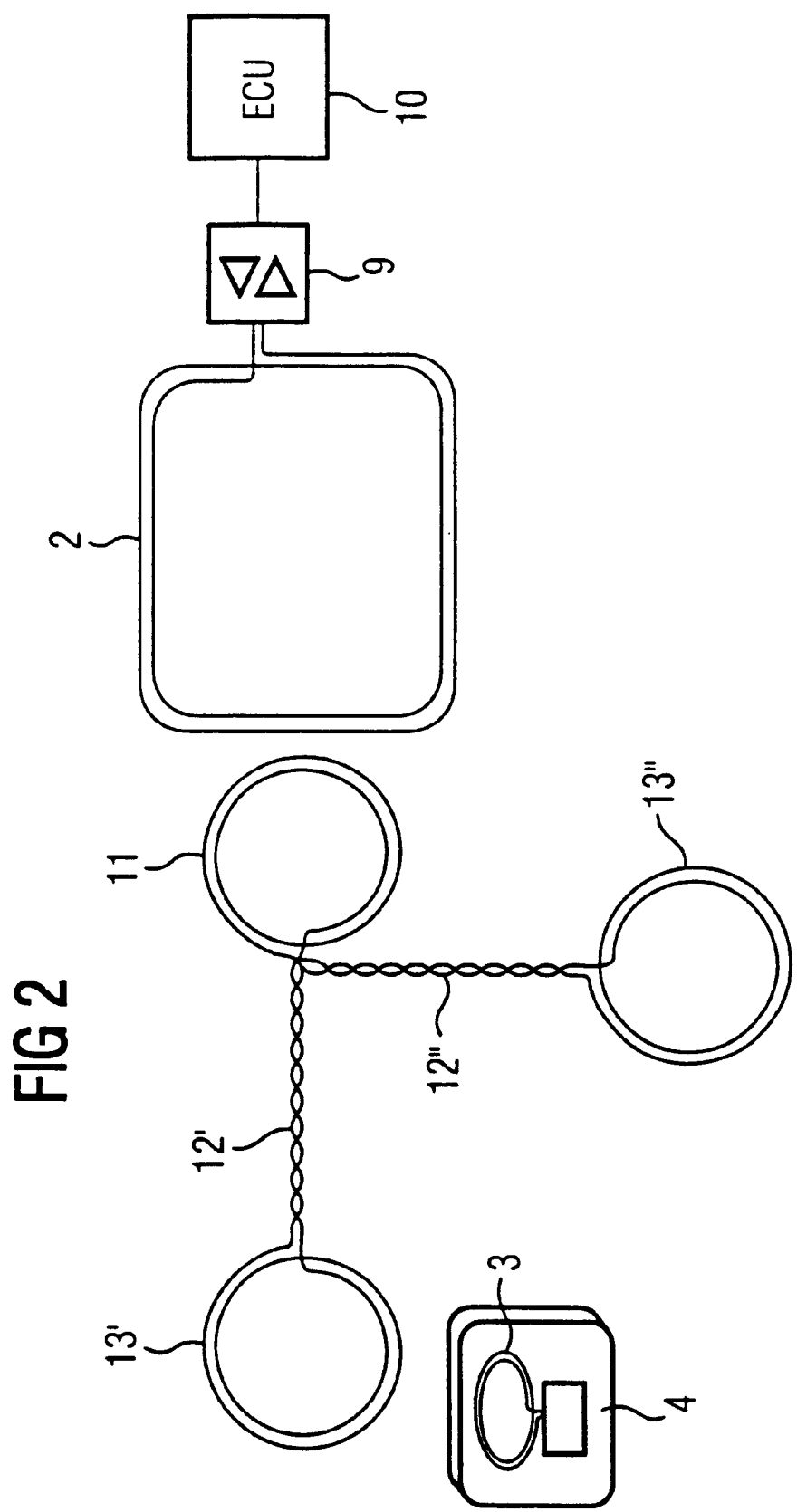

ANTENNA SYSTEM ESPECIALLY FOR AN ANTI-THEFT SYSTEM OF A MOTOR VEHICLE

FIELD OF THE INVENTION

The invention relates to an antenna system, especially for an anti-theft system of a motor vehicle. Such antenna system are used for the purpose of the wireless reception of coded information from a code transmitter and forwarding it to a control unit to check it for entitlement.

A known antenna system (DE 195 42 441 A1) has several coils as transmitting and receiving antennas which are distributed within the motor vehicle. A query signal is emitted through the sending and receiving antenna and is received by a portable transponder. The transponder then responds with an answering signal in which coded data is contained. The coded data is evaluated in a control unit in which it is compared with expected set data. If the data agree, a releasing signal is produced by which the door lock is locked or unlocked or an immobilizer of the vehicle is unlocked.

The signals are transmitted inductively by means of a magnetic field. Such magnetic fields, however, have a limited range, so that not every corner within the vehicle and directly around the vehicle can be pervaded by the magnetic field with sufficiently great field strength. Areas in which the magnetic field strength is too low are referred to as null areas. If the portable transponder finds itself in such a null area it receives no query signal from the sending and receiving antenna. Since the signals emitted by the transponder in turn have only a very short range, no response signal can be received from the sending and receiving antenna.

Furthermore, a merchandise theft apparatus is known (EP 0 414 628 A2) which has a plurality of antenna coils connected in parallel and lying in one plane, and a signal is emitted by each. Parallel to the antenna coils the additional antenna coils of a receiver are arranged, by which a signal from a code sender is received. The magnetic field through which a request signal is transmitted to the code sender is produced only by the antenna coils. Transformers at the transmitter output serve only to match the impedance of the transmitter to the antenna coils.

This problem is solved according to the invention by the features of claim 1. An antenna system has a magnetic coupling means which is connected by a conductor to a secondary coil. The magnetic coupling means is magnetically coupled to a sending and receiving antenna and carries signals from the sending and receiving antenna to the secondary coil or vice versa. The coupling means and the secondary coil do not have to be connected galvanically to the sending and receiving antenna. Thus the latter can be routed regardless of any conductors present or of a wiring harness. Also, such coupling means with connected secondary coil can be easily placed at nearly any location.

Advantageous embodiments of the invention are specified in the subordinate claims. Thus a plurality of secondary coils can be connected to a single coupling means. The secondary coils can thus be spaced closely together in a limited area. The secondary coils can be arranged in the driver's door, in the passenger's door, in the vehicle roof, in the vehicle floor, in the trunk lid, in the mudguard, in the car seats, in the dashboard, etc. Since the secondary coils can be made relatively small, they are largely independent of their placement. If the conductor between the coupling means and the secondary coil is a twisted pair, the power losses of the signals sent through the conductor are very low.

SUMMARY OF THE INVENTION

The invention is addressed to the problem of creating an antenna system for an anti-theft system whereby it will be possible—largely independently of the location of the code transmitter—for signals to be securely sent to the code transmitter and received by the latter as soon as the code transmitter is situated in the vicinity of the antenna system.

This problem is solved according to the invention by the features of claim 1. An antenna system has a magnetic coupling means which is connected by a conductor to a secondary coil. The magnetic coupling means is magnetically coupled to a sending and receiving antenna and carries signals from the sending and receiving antenna to the secondary coil or vice versa. The coupling means and the secondary coil do not have to be connected galvanically to the sending and receiving antenna. Thus the latter can be routed regardless of any conductors present or of a wiring harness. Also, such coupling means with connected secondary coil can be easily placed at nearly any location.

Advantageous embodiments of the invention are specified in the subordinate claims. Thus a plurality of secondary coils can be connected to a single coupling means. The secondary coils can thus be spaced closely together in a limited area. The secondary coils can be arranged in the driver's door, in the passenger's door, in the vehicle roof, in the vehicle floor, in the trunk lid, in the mudguard, in the car seats, in the dashboard, etc. Since the secondary coils can be made relatively small, they are largely independent of their placement. If the conductor between the coupling means and the secondary coil is a twisted pair, the power losses of the signals sent through the conductor are very low.

BRIEF DESCRIPTION OF THE DRAWINGS

An embodiment of the invention is explained below with the aid of the schematic figures, wherein.

DETAILED DESCRIPTION OF THE PREFERRED EMBODIMENT

Figure 1:
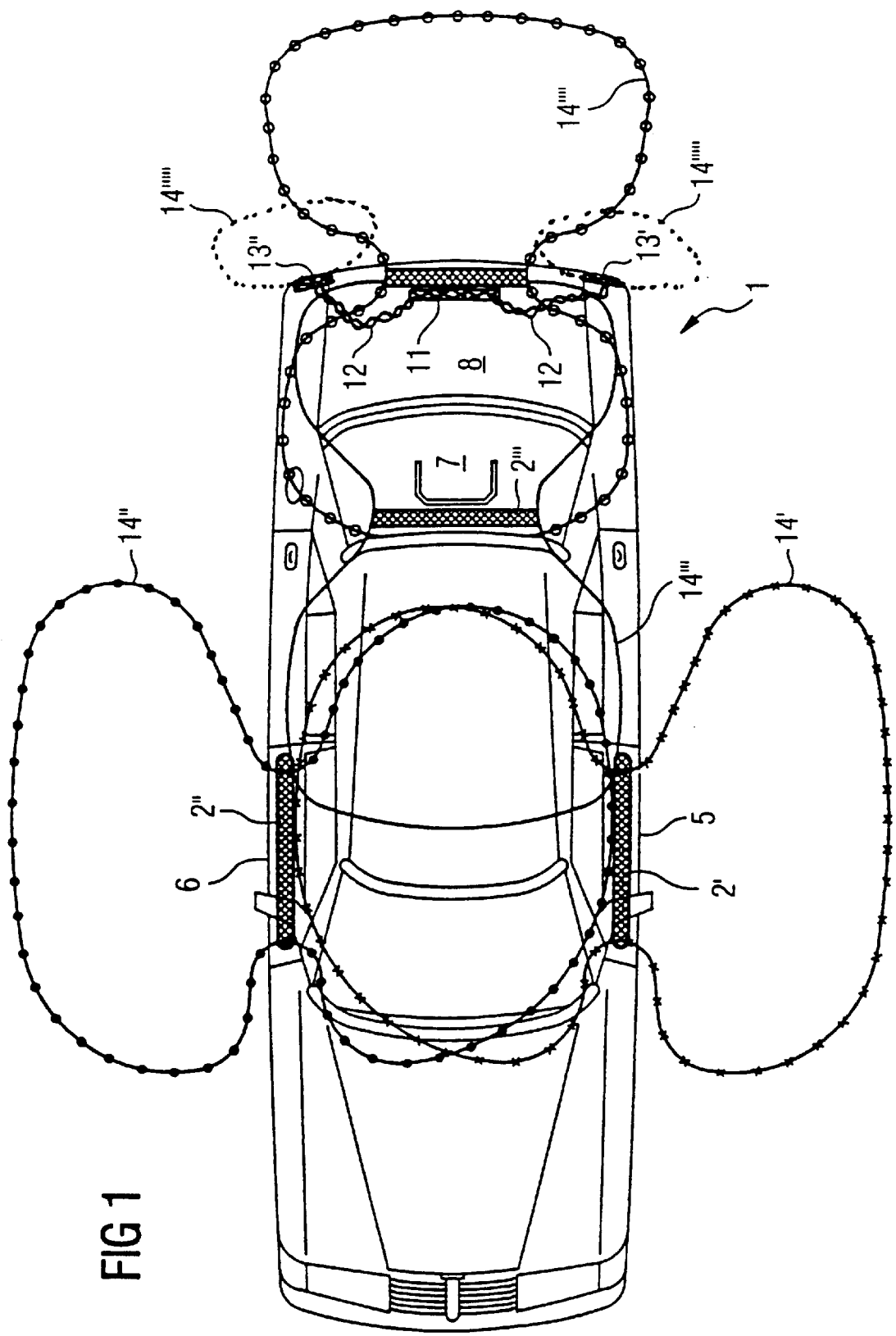
FIG. 1 shows an antenna system according to the invention for an anti-theft system which is installed in a vehicle, and FIG. 2 a block diagram of the antenna system of FIG. 1.

An antenna system according to the invention, especially for an anti-theft system, is preferably disposed in a motor vehicle 1 (FIG. 1). It has a plurality of sending and receiving antennas which are in the form of coils. Therefore the sending and receiving antennas are identified hereinafter as primary coils 2 (2', 2", 2'" and 2""). When signals are sent each primary coil 2 builds up an alternating magnetic field (hereinafter called primary field), which induces a corresponding alternating voltage in another transponder coil 3 of a transponder 4 (cf. FIG. 2) situated in the magnetic field. In this manner an inductive transmission of data or energy from the primary coil 2 to the transponder 4 takes place.

One primary coil 2 each, in the embodiment in FIG. 1, is installed in the driver's door 5, the passenger's door 6, the hat shelf 7 and the trunk lid 8. Signals (data or energy) are transmitted through the primary field. Vice versa, a voltage is induced in the primary coil 2 whenever the transponder coil 3 produces a magnetic field within whose range the primary coil 2 is located. Thus data or energy are received inductively by the primary coil 2.

The primary coils 2 are connected by a bidirectional end stage 9 (cf. FIG. 2) to a centrally located control unit 10. Since the inductive transmission of signals is already sufficiently known it will not be discussed further herein.

If access to the motor vehicle 1 is desired, then, for example by operating a door handle on the driver's door 5, a query signal is emitted through one of the primary coils 2 or several primary coils 2. If the transponder 4 receives the query signal it sends back coded data in a response signal. The response signal received by the primary coils is delivered to the control unit 10 and evaluated therein.

In order to determine the rights of the transponder 4 (this is also referred to as authentication), the coded data contained in the response signal is compared with expected data. If the two data are the same an unlock signal is produced by which locking means, such as door locks, not explicitly represented, are unlocked.

A further description of the primary coils 2 and the method of authentication are assumed to be known.

To enable the entire interior and the immediate space around the vehicle (this corresponds to the place where the transponder 4 carried by a user is situated, if the user wants to use the motor vehicle) to be filled with a sufficient magnetic field strength, magnetic coupling means 11 are provided according to the invention, which are connected by a line 12 to a secondary coil 13. The coupling means 11 are magnetically coupled with one of the primary coils 2. Thus the signals are carried from a primary coil 2 through the coupling means 11 and through one or more conductors 12 to one or more secondary coils 13 and vice versa.

Consequently, a magnetic field is also built up around the secondary coil 13 (hereinafter called a secondary field). If the secondary coils 13 are arranged in areas in which the primary field is not present or present only with too little field strength/intensity, signals can be sent in these areas by means of the secondary fields to transponders which are situated in these areas (for the trunk area of vehicle 1 this is shown in FIG. 1).

Vice versa, signals can be received through the secondary coils 13 by the transponder 4 if it is in one of these areas. Instead of the transponder 4, transmitters or code senders can also be used which are to send signals inductively to the primary coil 2, but are unable to receive any signals.

With the secondary field it is possible to create with the primary field a uniform and continuous receiving range 14 with individual receiving areas 14', 14'', 14''', etc., having as few gaps, i.e., null areas, as possible. The receiving range 14 is defined by the range of the magnetic field in which the intensity is still above a minimum threshold. The receiving ranges 14 of the illustrated primary coils 2 and of the illustrated secondary coils 13 are represented in FIG. 1 by marked lines.

Each coupling means 11 is, as represented in FIG. 2, located in the vicinity of a primary coil 2. It is important that the coupling means 11 be arranged within the primary field, since otherwise no signal transmission can occur.

The coupling means 11 are preferably in the form of coils. If then the winding diameters of the primary coil 2 and the coil of the coupling means 11 are the same, the two can be made as one unit and installed at the proper place.

The primary coils 2 can be fastened as needed in the motor vehicle 1 such that the entire interior is pervaded largely by the primary field and the secondary field. By mounting the secondary coils 13 at suitable locations, a continuous, gap-free magnetic field can be formed within the motor vehicle 1 by the secondary fields together with the primary field. A user can thus lay down his transponder 4 at any point in the motor vehicle. The transcoder 4 can consequently be addressed always surely by the query signal and send back its responding signal. Also whenever the user approaches the vehicle, the transponder can be in a shirt pocket, a pants pocket or in a purse. Even if the purse is put down, the transponder 4 therein can be addressed as long as a secondary coil 13 is in the foot area in the driver's door 5.

The secondary coil 13 produces together with the coupling means 11 a simple expansion of the primary field. The secondary coils 13 can easily be fastened and can be shaped according to their size. The secondary coils 13 can be placed in the driver's door 5, in the passenger's door 6, in the car roof or in the car floor, in the trunk lid 8 or in the mudguard in the vehicle's body. The secondary coils 13 can also be mounted wherever desired in the vehicle's interior, for example in the seats, on the dashboard, on the middle shelf or on the hat shelf 7.

The secondary coil 13 is preferably connected to the coupling means 11 by an easy to lay, flexible conductor 12. Thus the conductor 12 and the secondary coil 13 can be mounted easily and in any corner of the motor vehicle 1.

Advantageously the conductor 12 is a twisted pair. Thus line losses are low (low attenuation) and nearby electrical devices receive less electromagnetic interference.

Several conductors 12 can run parallel from the coupling means 11 to each secondary coil 13. Thus an additional, extended secondary field or many small secondary fields can form about the primary field.

Since the magnetic coupling of the primary coil 2 to the secondary coil 13 is lossy, the intensity of the secondary field is quite lower than that of the primary field. Of course, the secondary field can be placed selectively at points in whose immediate surroundings the transponder 4 may under certain circumstances be situated, the area of which is not quite pervaded by the primary field.

The coupling means 11 is then only a means connecting to the primary coil 2 and receives its signals inductively from the primary coil 2 and passes them on to the secondary coil 13 or it receives signals from the secondary coil 13 and passes them on inductively to the primary coil. The range is altered by the secondary coils 13 and the overall effective magnetic field is expanded. Even the remotest areas within a space can be pervaded by the secondary field, whose magnetic field strength must be sufficiently great to induce a sufficiently high voltage in the transponder coil 3.

Several coupling means 11 can be associated with each primary coil 2 provided that all coupling means 11 are well coupled magnetically with the primary coil 2. Likewise, several secondary coils 13 can be associated with each coupling means 11 and connected by conductors 12 with the coupling means.

The antenna system according to the invention can be used not only for motor vehicles, but anywhere where signals are inductively transmitted and received, and where an expansion of the magnetic fields in a simple manner is desired. Due to the coupling means 11 which is connected by conductor 12 to the secondary coil 13, a simple possibility is created of more or less enlarging the magnetic field of the primary coil 2. Such an enlargement or expansion of the magnetic field is then independent of any wire harness that may be present, or of any electrical connection between the control unit 10 and the individual primary coils 2. Since the secondary coils 13 can be made very small it is easy to mount them anywhere. The secondary coils 13 can be fastened at their location by known means (e.g., by cementing).

If the secondary coils 13 are fastened to the body of a motor vehicle 1, the immediate vicinity around the motor vehicle 1 can be pervaded gap-free on the one hand by the entire primary field and on the other hand by the entire secondary field. Thus it is assured that, regardless of the position of the transponder 4 in the vicinity of the motor vehicle 1, the latter can securely receive signals and send them back.

With the antenna system of the invention, successful authentication is largely independent of the position and orientation of the transponder coil 3. With the secondary coils 13 a secondary field can be created which contains magnetic field components in every direction, so that a voltage is with certainty induced whose level depends, of course, on the angle formed by the coil surface with the magnetic field components.

Because of the magnetic coupling of the primary field, a secondary field can be produced through coupling means 11, conductor 10 and the secondary coil 13, which due to the distribution of the secondary coils can act specifically in remote areas wherein the primary field no longer acts. The secondary coil 13 can very easily be placed together with conductor 10 at almost any mounting place.

What is claimed is:

1. Antenna system for an anti-theft system of a motor vehicle, comprising:
   a. at least one primary coil which produces a magnetic field by which a query signal controlled by a control unit is transmitted to a code sender and thereupon a response signal is received from the code sender,
   b. a magnetic coupling element which is disposed in the vicinity of the primary coil and which is coupled magnetically therewith, whereby the signals are inductively transferred from the primary coil to the coupling element and vice versa, and by
   c. at least one secondary coil disposed at a distance from the primary coil which is connected by a conductor to the coupling element and which produces an additional magnetic field through which the query signal is also transmitted to the code sender and thereupon the response signal is received from the code sender.

2. Antenna system according to claim 1, characterized in that the coupling element is connected with a plurality of secondary coils by conductors, the secondary coils being spatially distributed.

3. Antenna system according to claim 2, characterized in that one or more secondary coils are disposed in at least one of the driver's door, in the passenger's door, in the car roof, in the car floor, in the trunk lid, in the mudguard and in the interior of the vehicle.

4. Antenna system according to claim 1, characterized in that the conductor is a twisted-pair conductor.

5. Antenna system according to claim 1, characterized in that is it disposed in the motor vehicle and under control-by the control unit transmits the query signal to the code sender, that it then receives the response signal from the code sender in which coded data is contained, that the coded data is advanced to the control unit where the coded data is compared with set data, and that in case of identity between them a release signal is produced by which a locking unit is locked or unlocked.

* * * * *